United States Patent
Clinton et al.

(10) Patent No.: US 7,212,367 B2
(45) Date of Patent: May 1, 2007

(54) AMPERE WIRE WRITE HEAD WITH CONFINED MAGNETIC FIELDS

(75) Inventors: Thomas William Clinton, Pittsburgh, PA (US); Petrus Antonius van der Heijden, Cranberry Township, PA (US); Michael Allen Seigler, Pittsburgh, PA (US); Mark William Covington, Pittsburgh, PA (US); Werner Scholz, Pittsburgh, PA (US); Sharat Batra, Wexford, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 352 days.

(21) Appl. No.: 10/869,444

(22) Filed: Jun. 16, 2004

(65) Prior Publication Data

US 2005/0280935 A1    Dec. 22, 2005

(51) Int. Cl.
*G11B 5/02* (2006.01)
*G11B 5/187* (2006.01)

(52) U.S. Cl. .................. 360/55; 360/122; 360/128
(58) Field of Classification Search ................ 360/128
See application file for complete search history.

(56) References Cited

U.S. PATENT DOCUMENTS

| | | | |
|---|---|---|---|
| 4,191,982 A | 3/1980 | Wood et al. | |
| 4,405,960 A | 9/1983 | Pick et al. | |
| 4,631,612 A | 12/1986 | Shiiki et al. | |
| 4,656,546 A | 4/1987 | Mallory | |
| 4,763,215 A | 8/1988 | Gueugnon et al. | |
| 4,771,350 A | 9/1988 | Desserre | |
| 4,935,832 A | 6/1990 | Das et al. | |
| 5,075,956 A | 12/1991 | Das | |
| RE33,949 E | 6/1992 | Mallary et al. | |
| 6,381,094 B1 | 4/2002 | Gill | |
| 6,665,136 B2 | 12/2003 | Clinton et al. | |
| 2003/0021191 A1 | 1/2003 | Hsu et al. | |
| 2004/0169950 A1* | 9/2004 | Clinton et al. | 360/55 |

OTHER PUBLICATIONS

M. Mallary et al., "One Terabit per Square Inch Perpendicular Recording Conceptual Design," *IEEE Transactions on Magnetics*, vol. 38, No. 4, Jul. 2002, pp. 1719-1724.

* cited by examiner

*Primary Examiner*—Andrea Wellington
*Assistant Examiner*—Dan I Davidson
(74) *Attorney, Agent, or Firm*—Robert P. Lenart, Esq.; Pietragallo Bosick & Gordon, LLP

(57) ABSTRACT

A magnetic recording head comprises a write pole having a tip adjacent to an air bearing surface of the recording head, a return pole magnetically coupled to the write pole, a conductor positioned adjacent to an edge of the write pole at the air bearing surface, a first conductive heat sink connected to the conductor, and a second conductive heat sink connected to the conductor, wherein at least a portion of each of the first and second conductive heat sinks is positioned adjacent to the air bearing surface and wherein each of the first and second conductive heat sinks includes a structure for augmenting confinement of a magnetic write field adjacent to the write pole. Magnetic storage devices that include the magnetic recording head are also included.

30 Claims, 14 Drawing Sheets

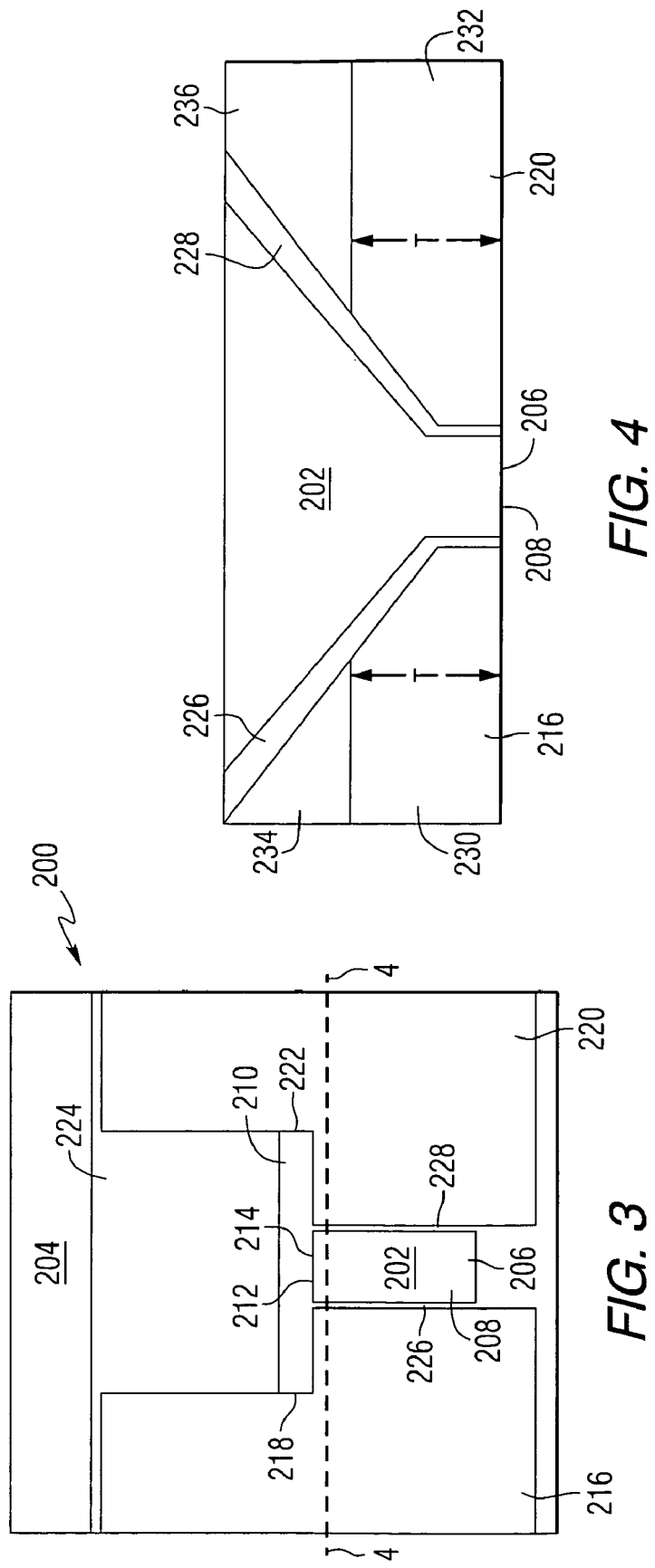

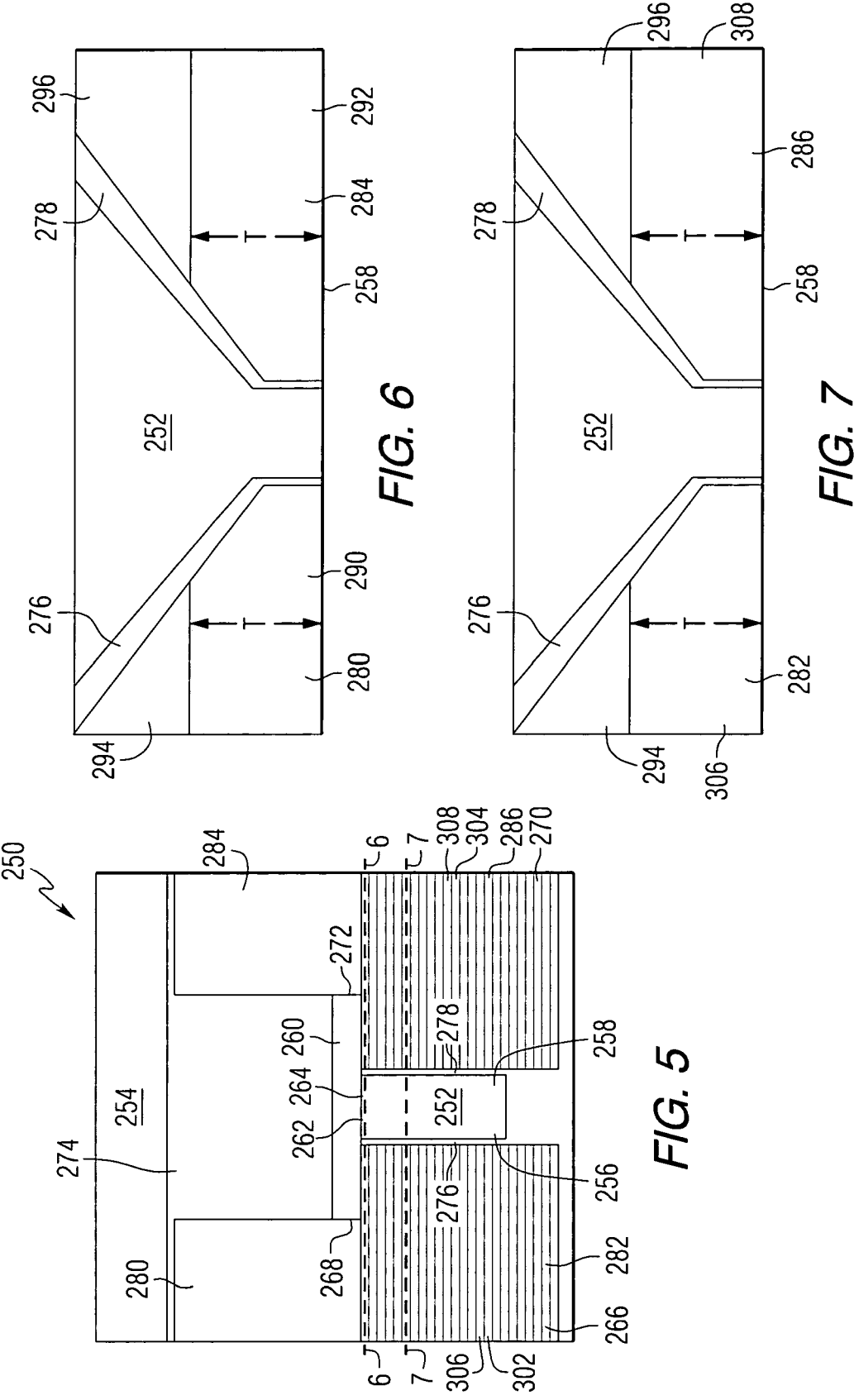

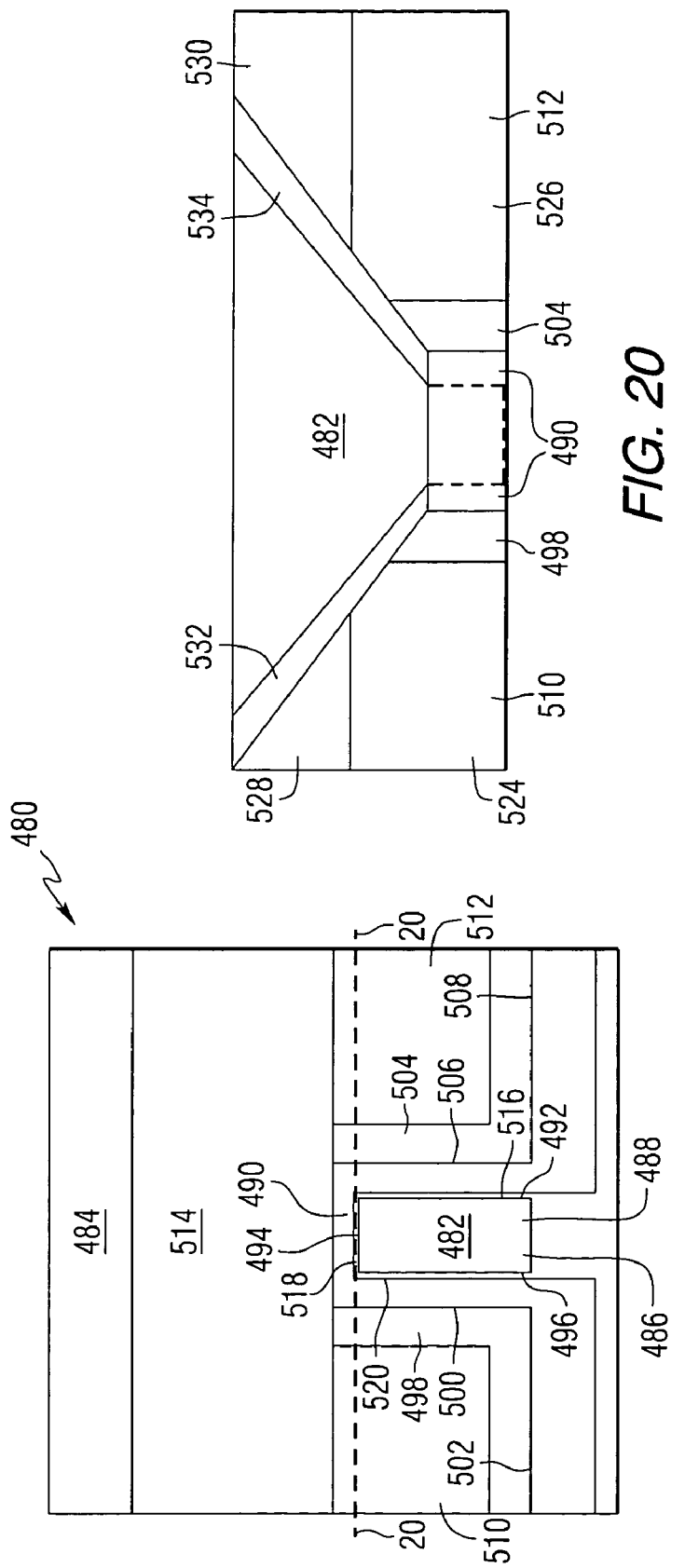

AMPERE WIRE WRITE HEAD WITH CONFINED MAGNETIC FIELDS

FIELD OF THE INVENTION

This invention relates to magnetic recording heads and more particularly to magnetic recording heads using a conductor to produce a recording field.

BACKGROUND OF THE INVENTION

As data storage densities in magnetic recording continue to progress in an effort to increase the storage capacity of hard disc drives, magnetic transition (bit) dimensions and recording head critical features are being pushed below 100 nm. In addition, making the recording medium stable at higher areal densities requires magnetically harder (high coercivity) storage medium materials. Traditionally, writing to a harder medium has been achieved by increasing the saturation magnetization, or $4\pi M_s$ value, of the magnetic material of the inductive write head, thus bolstering the magnetic field applied to the medium. Though there has been some success in materials research efforts to increase $M_s$ of the write head, the rate of increase is not sufficient to sustain the annual growth rate of bit areal densities in disc storage.

Another consequence of the rapid advance of areal densities is that write pole critical dimensions are decreasing faster than the corresponding Head-to-Media-Spacing (HMS). This presents a significant challenge to head design, as not only is the magnetic field strength effectively reduced, but the magnetic field profile at the media is more poorly confined, resulting in significant off-track fields that can cause undesirable effects such as adjacent track erasure, also referred to as side erasure. Thus, an important head design consideration is how to confine the magnetic fields more effectively without significantly degrading field strength at the media. A somewhat related issue is the need to shield the write head from the stray (or de-magnetization) fields of adjacent tracks, which can couple into the writer and interfere with the writing process.

Accordingly, there is a need for a magnetic recording head which is capable of overcoming the high coercivity of magnetic storage media, which confines the magnetic field produced at the write pole, and which shields the head from stray fields.

SUMMARY OF THE INVENTION

Magnetic recording heads constructed in accordance with this invention comprise a write pole having a tip adjacent to an air bearing surface of the recording head, a return pole magnetically coupled to the write pole, a conductor positioned adjacent to an edge of the write pole at the air bearing surface, a first conductive heat sink connected to the conductor, and a second conductive heat sink connected to the conductor, wherein at least a portion of each of the first and second conductive heat sinks is positioned adjacent to the air bearing surface and wherein each of the first and second conductive heat sinks includes a structure for augmenting confinement of a magnetic write field adjacent to the write pole.

In another aspect, the invention encompasses a magnetic storage device comprising a motor for rotating a storage medium, and an arm for positioning a recording head adjacent to the storage medium, wherein the magnetic recording head includes a write pole having a tip adjacent to an air bearing surface of the recording head, a return pole magnetically coupled to the write pole, a conductor positioned adjacent to an edge of the write pole at the air bearing surface, a first conductive heat sink connected to the conductor, and a second conductive heat sink connected to the conductor, wherein at least a portion of each of the first and second conductive heat sinks is positioned adjacent to the air bearing surface and wherein each of the first and second conductive heat sinks includes a structure for augmenting confinement of a magnetic write field adjacent to the write pole.

BRIEF DESCRIPTION OF THE DRAWINGS

FIG. 3 is a plan view of an air bearing surface of a magnetic recording head constructed in accordance with this invention.

FIG. 4 is a cross-sectional view of the magnetic recording head of FIG. 3 taken along line 4—4.

FIG. 5 is a plan view of an air bearing surface of another magnetic recording head constructed in accordance with this invention.

FIG. 6 is a cross-sectional view of the magnetic recording head of FIG. 5 taken along line 6—6.

FIG. 7 is a cross-sectional view of the magnetic recording head of FIG. 5 taken along line 7—7.

FIG. 19 is a plan view of an air bearing surface of another magnetic recording head constructed in accordance with this invention.

FIG. 20 is a cross-sectional view of the magnetic recording head of FIG. 19 taken along line 20—20.

DETAILED DESCRIPTION OF THE INVENTION

This invention provides a magnetic write head that is energized and field-amplified by a wire positioned adjacent to a write pole at an Air Bearing Surface (ABS). The wire that is used to produce the write field is referred to as an Ampere wire. The Ampere wire can generate large local magnetic fields (>kOe) by way of large current densities (>$10^9$ A/cm$^2$) in a thin-film wire. This recording head is referred to as a Wire Amplified Magnetic Recording (WAMR) head. The flux density from the Ampere wire can be high enough to magnetize the write pole(s) and generate enough additional flux density with an appropriate field direction and spatial profile to augment the write field. In addition to an increased field magnitude, the field profile from the wire maps onto that of the write pole so as to yield improved field gradients. In another aspect, one or more current-carrying coils can be included to magnetize the inductive writer and to supplement the field from the Ampere wire. In both coil-less designs as well as coil-supported designs, the magnetic field is confined in the cross-track direction using magnetic shields and/or a side-field canceling scheme using fields from currents in leads that supply current to the Ampere wire.

Figure 1:
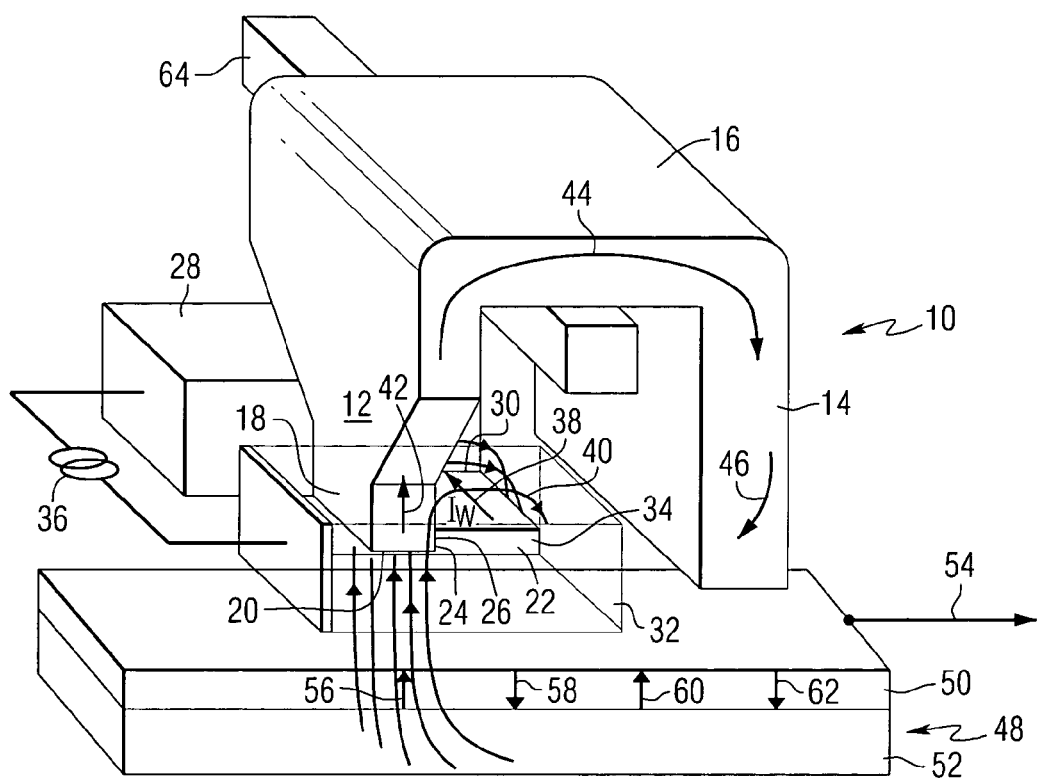
FIG. 1 is a pictorial representation of a magnetic recording head constructed in accordance with this invention.

Referring to the drawings, FIG. 1 is a pictorial representation of a magnetic recording head 10 constructed in accordance with this invention. The recording head includes a write pole 12 and a return pole 14 magnetically coupled by a yoke 16. A tip 18 of the write pole is positioned adjacent to an air bearing surface (ABS) 20 of the recording head. An Ampere wire in the form of a conductor 22 has a rectangular cross-section and is positioned along the air bearing surface and between the write pole and the return pole. An edge 24 of the conductor 22 is positioned adjacent to an edge 26 of the write pole. A first electrical contact/heat sink 28 is electrically connected to a first end 30 of the conductor. A second electrical contact/heat sink 32 is electrically connected to a second end 34 of the conductor. The electrical contact/heat sinks are coupled to a current source 36. Current from the current source flows through the electrical contact/heat sinks and the conductor as illustrated by arrow 38. This current creates a magnetic field around the conductor as illustrated by arrows 40. The magnetic field magnetizes the write pole, inducing magnetic flux through the yoke and the return pole as illustrated by arrows 42, 44 and 46. In operation, the air bearing surface of the recording head is positioned adjacent to a recording medium 48, that includes a magnetically hard recording layer 50 and a magnetically soft underlayer 52. As the recording medium moves as illustrated by arrow 54, the direction of magnetization of magnetic domains 56, 58, 60 and 62 in the recording layer is affected by the magnetic field in the vicinity of the write pole tip. Each of the conductive electrical contact/heat sinks includes a structure for augmenting confinement of a magnetic write field adjacent to the write pole. In one example, at least a portion of each of the electrical contact/heat sinks is comprised of a magnetic material that is magnetically coupled to the write pole adjacent the air bearing surface and acts to shield the write pole, and/or confine the write fields, primarily in the cross-track direction. In another example, the electrical contact/heat sinks include multiple layers of material having different electrical conductivities such that a current flowing in the electrical contact/heat sinks confines the magnetic field in the vicinity of the write pole at the air bearing surface.

A coil 64 can be used to additionally (magnetically) energize the write pole to provide additional write field. The coil can be wound around the yoke (with one or more turns) and includes at least one conductor passing between the write pole and the return pole. The coil can be excited with a current from current source 36 or a separate current source.

In the recording head of FIG. 1, the Ampere wire conductor is integrated with a "single-pole" writer at the ABS, such that one edge of the wire is near the inside edge of the single pole (or write pole), which is the writing (or trailing) edge. Thus, the wire is inside the gap formed between the write pole and the return pole. In this design the flux generated by the wire has the same orientation as the flux coupled into the magnetic yoke (both flowing clockwise in FIG. 1), and represents a very efficient magnetic coupling between the two elements. However, in another design, the return pole can be on the leading side of the writer (as opposed to the trailing side in this design), and in that case, the Ampere wire would not be inside the gap between the writer and the return pole. At high current densities in the Ampere wire (>$10^9$ A/cm$^2$), there is a large enough flux density generated local to the write pole that the magnetization of at least a portion of the write pole can be driven to saturation, beyond which the additional field from the wire augments the field from the pole, resulting in magnetic-field amplification.

Figure 2:
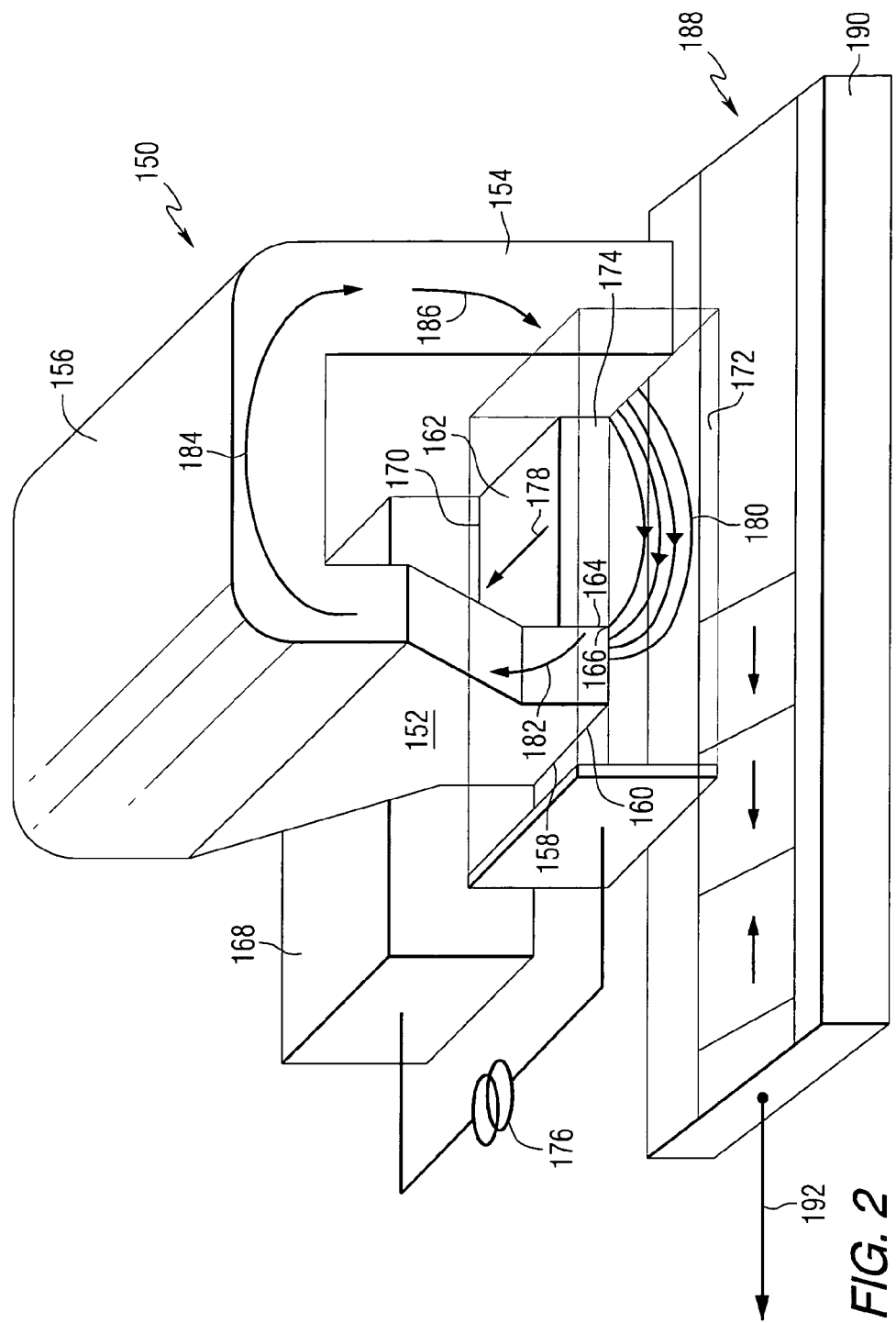
FIG. 2 is a pictorial representation of another magnetic recording head constructed in accordance with this invention.

FIG. 2 is a pictorial representation of another magnetic recording head 150 constructed in accordance with this invention. The recording head 150 includes a top pole 152 and a bottom pole 154 magnetically coupled by a yoke 156. A tip 158 of the top pole is positioned adjacent to an air bearing surface (ABS) 160 of the recording head. A conductor 162 has a rectangular cross-section and is positioned along the air bearing surface and between the top pole and the bottom pole. An edge 164 of the conductor 162 is positioned adjacent to an edge 166 of the top pole. A first electrical contact/heat sink 168 is electrically connected to a first end 170 of the conductor. A second electrical contact/heat sink 172 (shown in phantom) is electrically connected to a second end 174 of the conductor. The electrical contact/heat sinks are coupled to a current source 176. Current from the current source flows through the electrical contact/heat sinks and the conductor as illustrated by arrow 178. This current creates a magnetic field around the conductor as illustrated by arrows 180. The magnetic field induces a magnetic field in the top pole, which passes through the yoke and bottom pole as illustrated by arrows 182, 184 and 186. In operation, the air bearing surface of the recording head is positioned adjacent to a recording medium 188, that includes a magnetically hard recording layer 190. As the recording media moves as illustrated by arrow 192, the direction of magnetization of magnetic domains in the recording layer is affected by the magnetic field in the vicinity of the write pole tip. At least a portion of the contacts/heat sinks 168 and 172 is positioned adjacent to the air bearing surface and can include magnetic material.

FIG. 2 is an example of a longitudinal writer. In the example of FIG. 2, the Ampere wire is sandwiched by the top and bottom pole of an inductive writer. Again, the wire can drive the writer on its own, and the fields from the yoke and the wire superimpose to yield an amplified net write field. Alternatively, a separate coil could be included to additionally (magnetically) energize the writer. The longitudinal writer uses the longitudinal field component to write, and much like the perpendicular case, the net-field magnitude and gradients are increased by the action of the Ampere wire.

The materials for the wire can range from conventional good electrical and thermal conductors (a small coefficient of thermal expansion is also desirable), such as Cu, Au, Al, W, Mo, etc., to materials such as carbon nanotubes.

The contacts/heat sinks can also include portions made with conventional high conductivity materials that are compatible with head processing techniques. The write current can be a traditional (continuous) AC bias (square wave, for example), as heat generated at the proposed high-current densities will be dissipated primarily through the cooling power available at the ABS for a head in flight. This cooling power is well coupled with the head due to the large surface area of the slider and the large contacts that readily sink the Ohmic heat generated in the Ampere wire to the slider.

FIG. 3 is a plan view of an air bearing surface of another magnetic recording head 200 constructed in accordance with this invention. The recording head includes a write pole 202 and a return pole 204. A tip 206 of the write pole is positioned adjacent to an air bearing surface (ABS) 208 of the recording head. A conductor 210 has a rectangular cross-section and is positioned along the air bearing surface and between the write pole and the return pole. An edge 212 of the conductor 210 is positioned adjacent to an edge 214 of the write pole. A first electrical contact/heat sink 216 is electrically connected to a first end 218 of the conductor. A second electrical contact/heat sink 220 is electrically connected to a second end 222 of the conductor. Insulation 224 is positioned between the conductor and the return pole, and between the electrical contacts and the return pole. Additional insulation 226 and 228 is positioned on the sides of the electrical contacts to insulate them from the write pole. In this example, the electrical contact/heat sinks are comprised of a magnetically soft material.

The recording head of FIG. 3 is a perpendicular WAMR head with current leads constructed of a magnetic material of high permeability, such as, NiFe, CoFe or alloys of NiFe or CoFe. The leads are electrically isolated from both the magnetic pole and return pole with appropriate thickness insulating layers, such as $Al_2O_3$, SiN, or $SiO_2$. However, there is magnetic coupling of the magnetic leads to the write pole and the return pole that can be tuned separately by the insulator thicknesses, the volume of magnetic material, the area at the interfaces between the leads and poles, the magnetic properties of the materials used, etc. This tuning can be used to control the reluctance, the magnetic field magnitude, and/or the magnetic field profile. The shields can divert the magnetic write field. This diversion has to be balanced against the needed field profile (magnetic field vs. field profile).

FIG. 4 is a cross-sectional view of the magnetic recording head of FIG. 3 taken along line 4—4. FIG. 4 shows that the leads 216 and 220 each include a soft magnetic material 230 and 232 at the ABS, that extends away from the ABS by a certain thickness, T, while beyond that thickness the leads include a material 234 and 236 with ideal electrical and thermal properties, such as Cu or Au, or the like. The thickness is dictated by the needed magnetic reluctance, and depends on the pole width, shield material, head-to-media spacing, etc., which are usually estimated using modeling. Insulation 226 and 228 insulates the leads from the pole. The magnetic leads are designed to confine the cross-track magnetic field profile of the WAMR, as the soft magnetic material acts as both a return path for flux emanating from the head and as a magnetic shield (shielding the write pole from fields emanating from adjacent tracks). Because the leads also act as heat sinks for the Ampere wire, the magnetic material should have good thermal properties.

FIG. 5 is a plan view of an air bearing surface of another magnetic recording head 250 constructed in accordance with this invention. The recording head includes a write pole 252 and a return pole 254. A tip 256 of the write pole is positioned adjacent to an air bearing surface (ABS) 258 of the recording head. A conductor 260 has a rectangular cross-section and is positioned along the air bearing surface and between the write pole and the return pole. An edge 262 of the conductor 260 is positioned adjacent to an edge 264 of the write pole. A first electrical contact/heat sink 266 is electrically connected to a first end 268 of the conductor. A second electrical contact/heat sink 270 is electrically connected to a second end 272 of the conductor. Insulation 274 is positioned between the conductor and the return pole, and between the electrical contacts and the return pole. Additional insulation 276 and 278 is positioned on the sides of the electrical contacts to insulate them from the write pole. The electrical contact/heat sink 266 is comprised of a section 280 of magnetically soft material and a multi-layer section 282 of alternate layers 302, 306 of magnetically soft material and highly conductive material, respectively. The electrical contact/heat sink 270 is comprised of a section 284 of magnetically soft material and a multi-layer section 286 of alternate layers 304, 308 of magnetically soft material and highly conductive material, respectively.

FIG. 6 is a cross-sectional view of the magnetic recording head of FIG. 5 taken along line 6—6. FIG. 6 shows that the lead sections 282 and 286 each include a soft magnetic material 290 and 292 at the ABS that extends away from the ABS by a certain thickness, T, while beyond that thickness the lead includes a material 294 and 296 with ideal electrical and thermal properties, such as Cu or Au, or the like. Insulation 276 and 278 insulates the leads from the pole.

FIG. 7 is a cross-sectional view of the magnetic recording head of FIG. 5 taken along line 7—7. FIG. 7 shows that the lead sections 282 and 286 each include a highly conductive material 306 and 308. Insulation 276 and 278 insulates the leads from the pole.

The example of FIGS. 5, 6 and 7 shows a multi-layer lead/heat sink structure including layers of soft magnetic material and layers of material with ideal electrical and thermal properties (high conductivity), such as Cu or Au, or the like. The leads are electrically isolated from both the magnetic pole and return pole with insulating layers having an appropriate thickness. However, there is magnetic coupling of the multi-layer leads to the write pole and return pole that can be tuned separately by the insulator thicknesses, the volume of magnetic material, the area at the interfaces between the leads and poles, the magnetic properties of the materials used, the number of layers and varying thicknesses for the multi-layer, etc. Additionally, the multi-layer structure allows for its own magneto-static and magneto-dynamic properties to be readily tuned. For example, a large magnetic saturation $M_s$ value for the magnetic layer results in a large ferromagnetic resonance (FMR) frequency, which is desirable for high frequencies (high data rates), while the thickness of the non-magnetic layer can be tuned to achieve the desired average magnetization M, for the leads. The multi-layer leads extend from the ABS a certain thickness, while beyond that thickness, the lead is made of material with ideal electrical and thermal properties, such as Cu or Au, or the like. The soft magnetic material of the multi-layer section has the effect of confining the cross-track fields as discussed above, while the incorporation of the highly conducting layers aids in the heat sinking of the Ampere wire.

Figure 8:
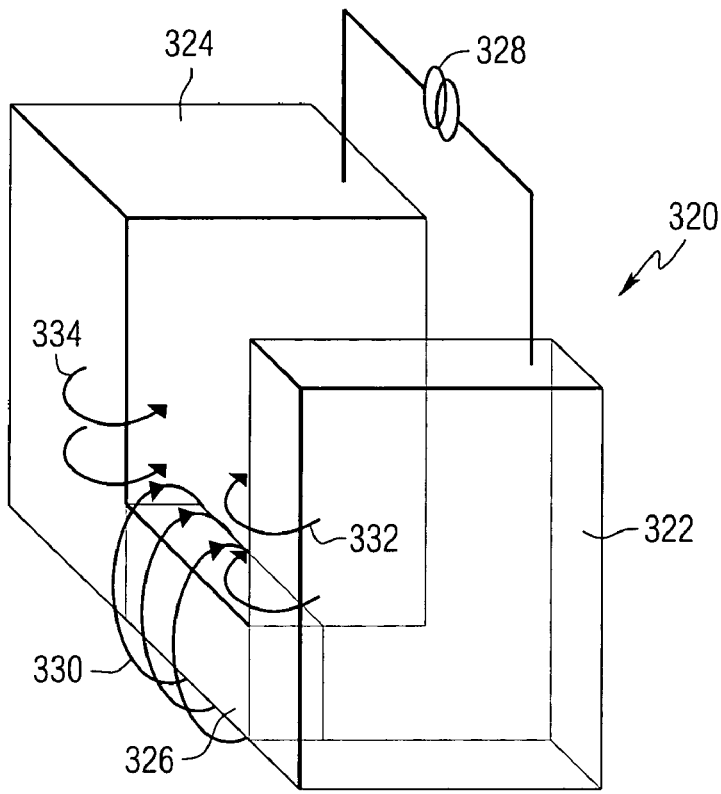
FIG. 8 is a schematic representation of another magnetic recording head constructed in accordance with the invention.

FIG. 8 is a schematic representation of a portion of a magnetic recording head 320 constructed in accordance with the invention. Conductive lead/heat sinks 322 and 324 are electrically connected to opposite ends of a generally rectangular conductor 326 and to a current source 328. The leads have a larger cross-sectional area than the conductor and the conductor is located near a corner of the leads. This configuration can be used to illustrate controlled current crowding in the contacts to reduce cross-track fields in a WAMR head. Current flowing in conductor 326 produces the magnetic field 330. Current flowing in leads 322 and 324 produces magnetic fields 332 and 334. The field produced by current flowing in the leads reduces cross-track fields resulting from current in conductor 326.

Figure 9:
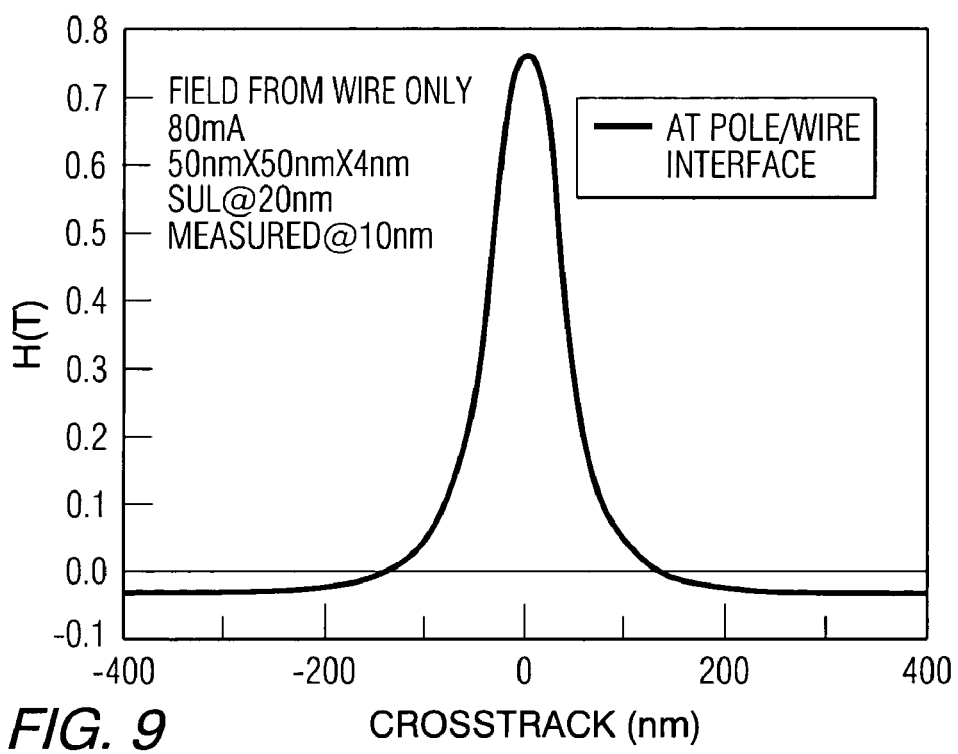
FIG. 9 is a graph of the calculated cross-track magnetic field for the recording head of FIG. 8.

FIG. 9 is a graph of the calculated cross-track magnetic field distribution associated with an Ampere wire and leads/contacts in the configuration of FIG. 8. The field profile indicates that there is a reversal of the field polarity with increasing cross-track position. This field is generated by the large current densities in the leads, while the high densities result from current crowding in the leads near the Ampere wire, as depicted in FIG. 8. In a WAMR structure (an integrated wire and pole such as depicted in any of the perpendicular designs herein), this reversed field polarity counters that from the pole, reducing the stray fields away from the track. The head designs described below use this effect to confine the cross-track fields for perpendicular WAMR.

Figures 10, 11:
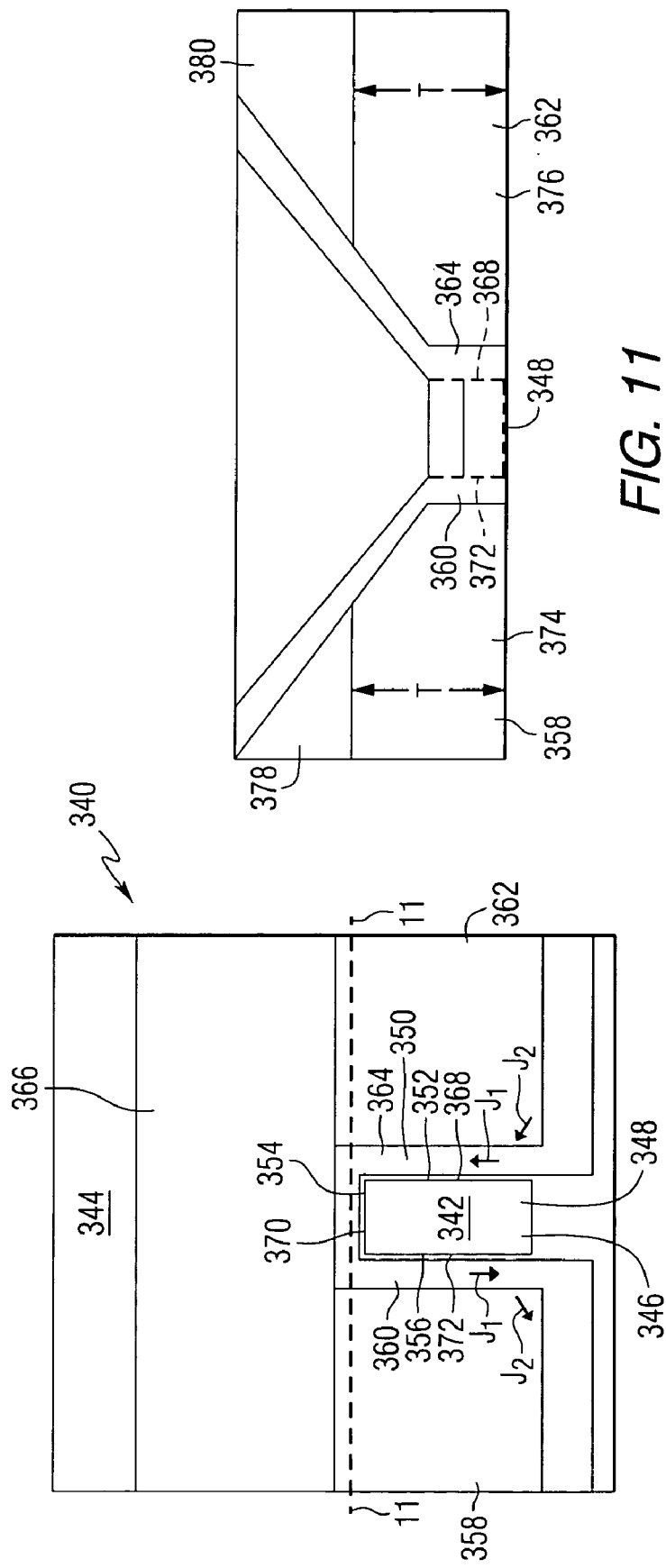
FIG. 10 is a plan view of an air bearing surface of another magnetic recording head constructed in accordance with this invention.
FIG. 11 is a cross-sectional view of the magnetic recording head of FIG. 10 taken along line 11—11.

FIG. 10 is a plan view of an air bearing surface of another magnetic recording head 340 constructed in accordance with this invention. The recording head includes a write pole 342 and a return pole 344. A tip 346 of the write pole is positioned adjacent to an air bearing surface (ABS) 348 of the recording head. A first conductor and heat sink 350, having a conductivity $\sigma_1$, is positioned adjacent to the air bearing surface and adjacent to three surfaces 352, 354 and 356 of the write pole. A segment of the conductor adjacent to surface 354 of the write pole acts as the Ampere wire. A second electrical contact/heat sink 358, having a conductivity $\sigma_2$, is electrically connected to a first portion 360 of the conductor. A third electrical contact/heat sink 362 having a conductivity $\sigma_2$, is electrically connected to a second portion 364 of the conductor. Insulation 366 is positioned between the conductor and the return pole, and between the electrical contacts and the return pole. Additional insulation 368, 370 and 372 is positioned between the conductor and the write pole. Conductivity $\sigma_1$ can be greater than conductivity $\sigma_2$ by about a factor of 10. $J_1$ and $J_2$ represent electrical current in the conductor 350 and the contact/heat sinks 358 and 362.

FIG. 11 is a cross-sectional view of the magnetic recording head of FIG. 10 taken along line 11—11. FIG. 11 shows that the leads 358 and 362 each include a soft magnetic material 374 and 376 having conductivities of $\sigma_2$ at the ABS that extend behind the ABS by a certain thickness, T, while beyond that thickness the lead includes a highly conductive (greater than $\sigma_2$) material 378 and 380 such as Cu or Au, or the like. Insulation 368 and 372 insulates conductor portions 360 and 364 from the pole.

FIGS. 10 and 11 show an example where the Ampere wire is continuous with a highly conductive metal layer on the sides of the pole that also extends away from the pole in the plane of the wafer. In addition, there is a thin insulating layer to electrically isolate the metal layer that forms the Ampere wire from the pole. The metal layer is surrounded by and electrically in contact with additional metal leads that have an appropriately lower electrical conductivity ($\sigma_2$). The first metal layer, because of its higher conductivity ($\sigma_1$), can carry a higher current density, and is intended to produce a strong side field with a polarity opposite that of the write-pole, resulting in a reduced side field and improved cross-track field confinement. The thickness of the highly conductive metal layer (on the sides of the pole and in the plane of the wafer) is engineered to produce the optimum cross-track field profile.

In the example of FIG. 10, the high-conductivity leads (of resistance $R_1$) may or may not be in electrical contact with the side shields (of resistance $R_2$), but, as a result of a much lower resistance ($R_2 \gg R_1$), most of the current is carried by the lead. The magnetic coupling of the side shields to the pole, top shield, and return pole can be tuned separately by adjusting the insulator thicknesses, the Ampere-conductor thickness, the volume of magnetic material, the area at the interfaces between the leads and poles, the magnetic properties of the materials used, etc. The shields ($R_2$) extend from the ABS a certain distance that is independent of the distance that the leads ($R_1$) extend from the ABS. The leads can be made of materials with ideal electrical and thermal properties, such as Cu or Au, or the like. The side and top shields are designed to confine the magnetic field profile of the WAMR, as the soft magnetic material acts as both a return path for flux emanating from the head and as a magnetic shield (shielding the write pole from fields emanating from adjacent tracks). Examples of suitable magnetic materials include NiFe, CoFe, and a Cu/CoFe multi-layer structure. The higher current density in the leads produces a strong side field with polarity opposite that of the write-pole. This effect, in combination with the soft magnetic material of the side shields, results in reduced side fields, good cross-track field confinement, and shielding from adjacent tracks.

Figure 12:
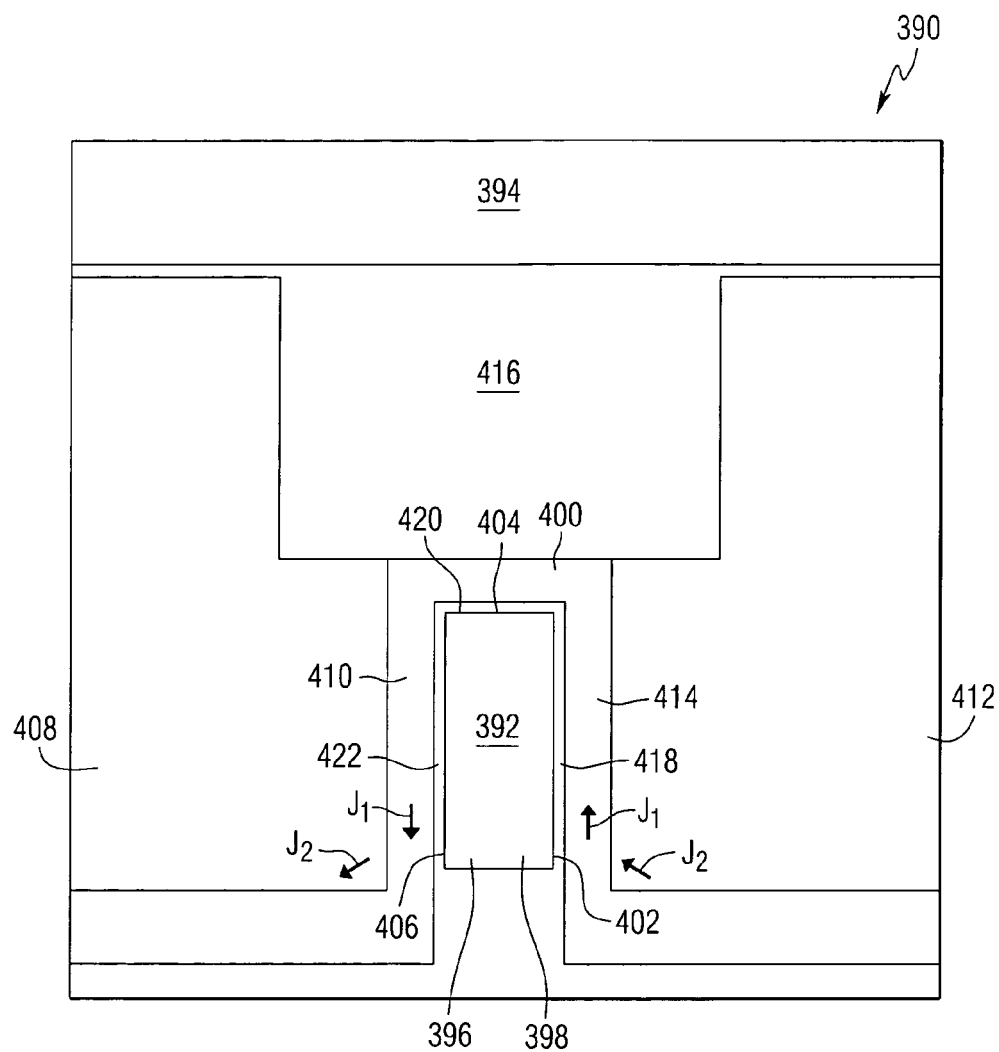
FIGS. 12 and 13 are plan views of an air bearing surface of other magnetic recording heads constructed in accordance with this invention.

FIG. 12 is a plan view of an air bearing surface of another magnetic recording head 390 constructed in accordance with this invention. The recording head includes a write pole 392 and a return pole 394. A tip 396 of the write pole is positioned adjacent to an air bearing surface (ABS) 398 of the recording head. A conductor 400, having a conductivity $\sigma_1$, is positioned along the air bearing surface and extends along three surfaces 402, 404 and 406 of the write pole. The Ampere wire is formed by the section of the conductor that is adjacent to surface 404. A first electrical contact/heat sink 408, having a conductivity $\sigma_2$, is electrically connected to a first portion 410 of the conductor. A second electrical contact/heat sink 412 having a conductivity $\sigma_2$, is electrically connected to a second portion 414 of the conductor. Conductivity $\sigma_1$ is greater than conductivity $\sigma_2$. Insulation 416 is positioned between the conductor and the return pole, and between the electrical contacts and the return pole. Additional insulation 418, 420 and 422 is positioned between the conductor and the write pole.

FIG. 12 is similar to the example of FIG. 10 where each metal lead has an appropriately lower electrical conductivity ($\sigma_2$). The conductivities and materials would be engineered according to the given application. The first metal layer because of its higher conductivity ($\sigma_1$) will carry a higher current density, producing a strong side field with polarity opposite that of the write pole. This effect in combination with the soft magnetic material results in reduced side fields, good cross-track field confinement, and shielding from adjacent tracks.

Figure 13:
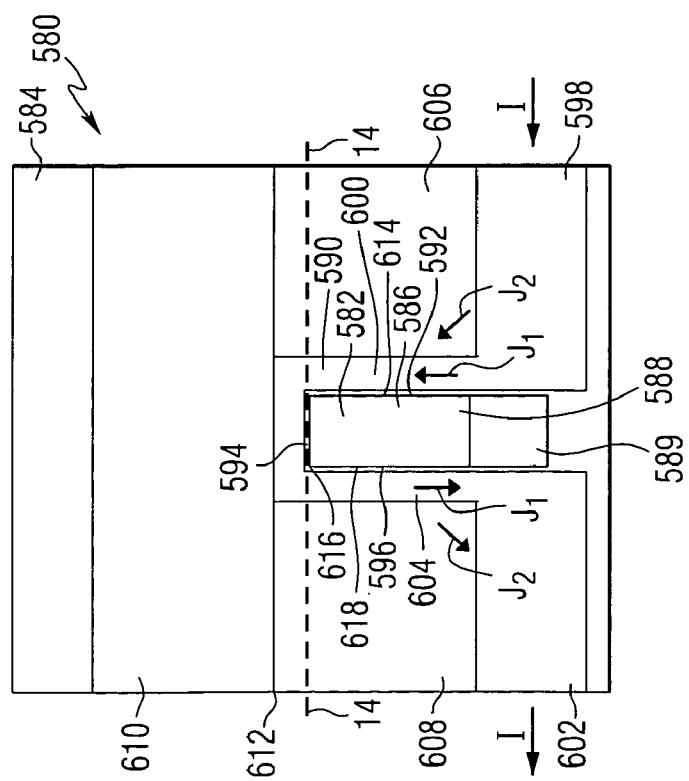

FIG. 13 is a plan view of an air bearing surface of another perpendicular WAMR magnetic recording head 580 constructed in accordance with this invention and having high conductivity current leads underlying a magnetic material of high permeability that acts as a side flux return path, or side shield. The recording head includes a write pole 582 and a return pole 584. A tip 586 of the write pole is positioned adjacent to an air-bearing surface (ABS) 588 of the recording head and on a nonmagnetic base 589. A conductor 590, having a conductivity $\sigma_1$ and resistivity $\rho_1$, is positioned along the air-bearing surface and extends along three surfaces 592, 594 and 596 of the write pole. In this example, the Ampere wire is the portion of the conductor positioned adjacent to the top surface of the pole surface 594.

A first electrical contact/heat sink 598, having the same conductivity $\sigma_1$ and resistivity $\rho_1$, is electrically connected to a first portion 600 of the conductor. A second electrical contact/heat sink 602 having the same conductivity $\sigma_1$ and resistivity $\rho_1$, is electrically connected to a second portion 604 of the conductor. A first side shield 606 is positioned adjacent to a first portion of the conductor 590, and has a second conductivity $\sigma_2$ and a second resistivity $\rho_2$. A second side shield 608 is positioned adjacent to a second portion of the conductor 590, and has the same second conductivity $\sigma_2$ and second resistivity $\rho_2$. Another shield 610 is positioned between the write pole and the return pole. Insulation 612 is positioned between the shield 610 and the shields 606 and 608, and conductor 590. Conductivity $\sigma_1$ is greater than conductivity $\rho_2$. Additional insulation 614, 616 and 618 is positioned between the conductor and the write pole. Conductors 598 and 602 have a cross-sectional area that is large compared to the cross-sectional area of the conductor 590 that wraps around the write pole. Shields 606 and 608 extend along the sides of the write pole, and may be insulated from the adjacent conductors.

Figure 14:
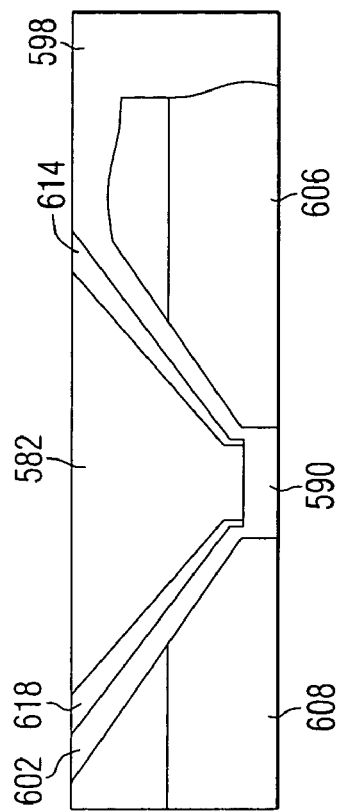
FIG. 14 is a cross-sectional view of the magnetic recording head of FIG. 13 taken along line 14—14.

In the example of FIG. 13, the high-conductivity leads (of resistance $R_1$) may or may not be in electrical contact with the side shields (of resistance $R_2$), but, as a result of a much lower resistance ($R_2 \gg R_1$), most of the current is carried by the leads. The overlying top shield 610 provides a low reluctance path from the side shields to the return pole. Insulating layers isolate the leads from each other so the current is forced to go through the Ampere wire portion of conductor 590. The magnetic coupling of the side shields to the pole, top shield, and return pole can be tuned separately by adjusting the insulator thicknesses, the Ampere-conductor thickness, the volume of magnetic material, the area at the interfaces between the leads and poles, the magnetic properties of the materials used, etc. The shields ($R_2$) extend from the ABS a certain distance that is independent of the distance that the leads ($R_1$) extend from the ABS. The leads can be made of materials with ideal electrical and thermal properties, such as Cu or Au, or the like. The side and top shields are designed to confine the magnetic field profile of the WAMR, as the soft magnetic material acts as both a return path for flux emanating from the head and as a magnetic shield (shielding the write pole from fields emanating from adjacent tracks). Examples of suitable magnetic materials include NiFe, CoFe, and a Cu/CoFe multi-layer structure. The higher current density in the leads produces a strong side field with polarity opposite that of the write-pole. This effect, in combination with the soft magnetic material of the side shields, results in reduced side fields, good cross-track field confinement, and shielding from adjacent tracks. Because the shields also act as heat sinks for the Ampere wire, the magnetic material should have good thermal properties. FIG. 14 is a cross-sectional view of the head of FIG. 13 taken along line 14—14.

Figure 15:
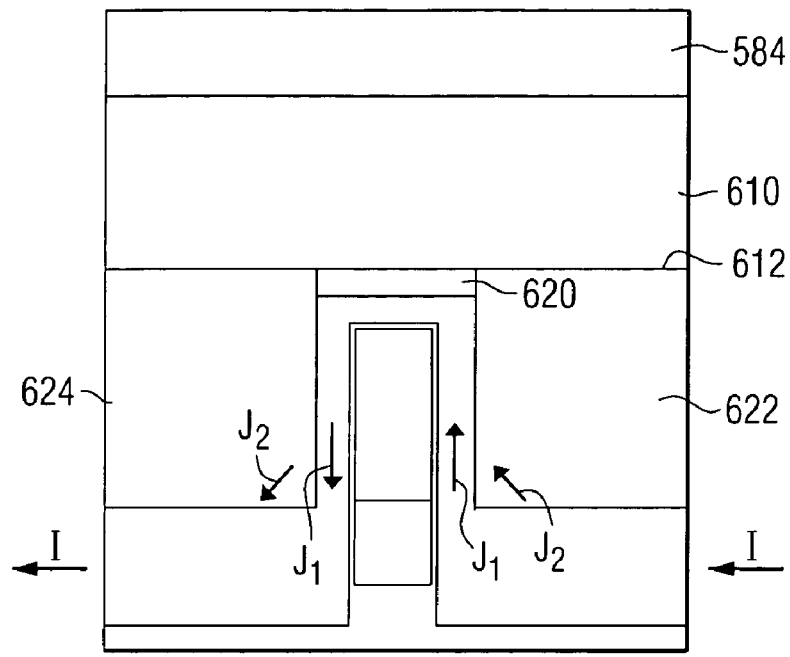
FIGS. 15, 16 and 17 are plan views of an air bearing surface of other magnetic recording heads constructed in accordance with this invention.

FIG. 15 is another example similar to that of FIG. 13, where a spacer layer 620 is incorporated above the Ampere wire for the purpose of tuning the down track field profile. In the example of FIG. 15, the side shields 622 and 624 are thicker to accommodate the thickness of the spacer. The high-conductivity leads (of resistance $R_1$) may or may not be in electrical contact with the side shields (of resistance $R_2$), but, as a result of a much lower resistance ($R_2 \gg R_1$), most of the current is carried by the lead. The magnetic coupling of the side shields to the pole, top shield, and return pole can be tuned separately by adjusting the insulator thicknesses, the Ampere-conductor thickness, the volume of magnetic material, the area at the interfaces between the leads and poles, the magnetic properties of the materials used, etc. The shields ($R_2$) extend from the ABS a certain distance that is independent of the distance that the leads ($R_1$) extend from the ABS. The leads can be made of materials with ideal electrical and thermal properties, such as Cu or Au, or the like. The side and top shields are designed to confine the magnetic field profile of the WAMR, as the soft magnetic material acts as both a return path for flux emanating from the head and as a magnetic shield (shielding the write pole from fields emanating from adjacent tracks). Examples of suitable magnetic materials include NiFe, CoFe, and a Cu/CoFe multi-layer structure. The higher current density in the leads produces a strong side field with polarity opposite that of the write-pole. This effect, in combination with the soft magnetic material of the side shields, results in reduced side fields, good cross-track field confinement, and shielding from adjacent tracks.

Figure 16:
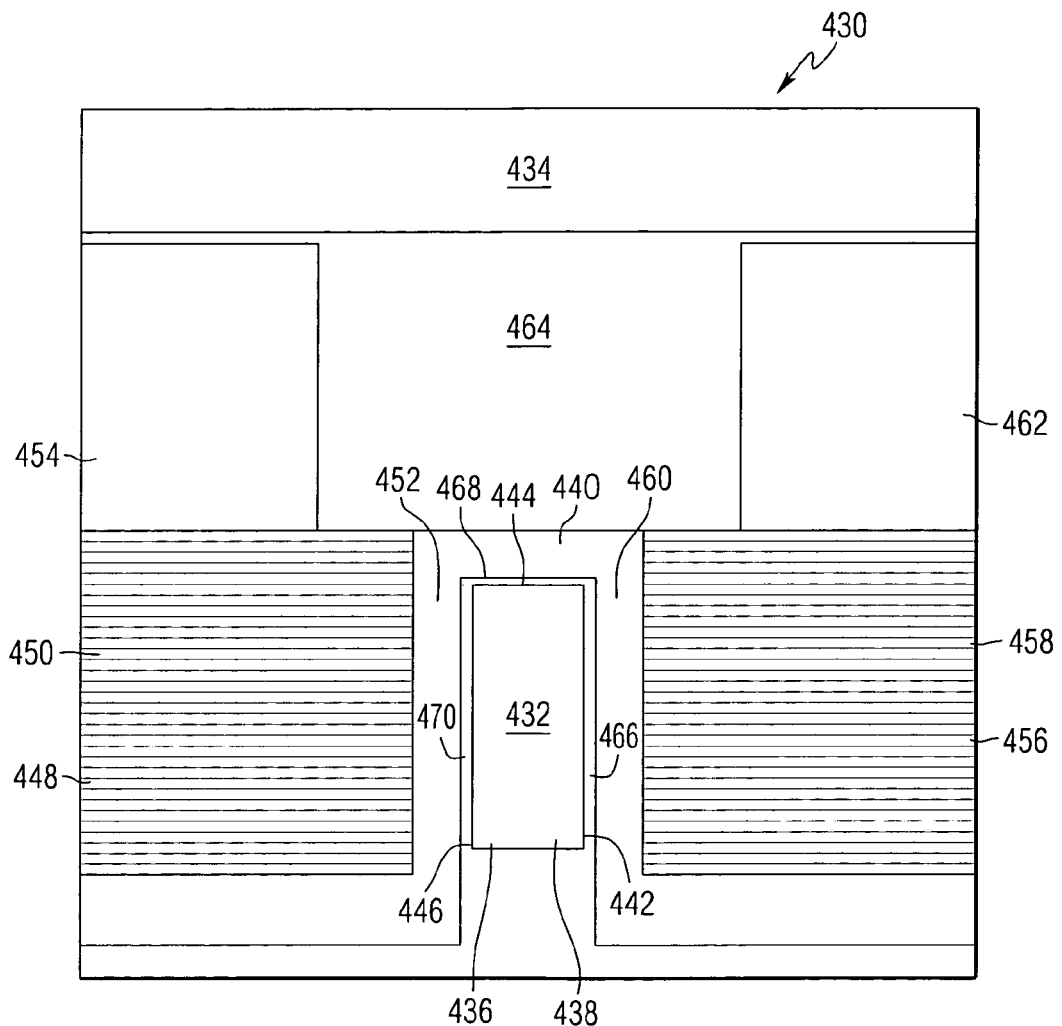

FIG. 16 is a plan view of an air bearing surface of another magnetic recording head 430 constructed in accordance with this invention. The recording head includes a write pole 432 and a return pole 434. A tip 436 of the write pole is positioned adjacent to an air bearing surface (ABS) 438 of the recording head. A first conductor 440, having a conductivity $\sigma_1$, is positioned along the air bearing surface and extends along three surfaces 442, 444 and 446 of the write pole. The Ampere wire is formed by the section of conductor 440 that is adjacent to surface 444. A second electrical contact/heat sink 448 includes a first multi-layer section 450 having alternating layers of soft magnetic material and highly conductive material, and has a conductivity $\sigma_2$. Section 450 is electrically connected to a first portion 452 of the conductor. The first electrical contact/heat sink 448 also includes a second section 454 comprised of a soft magnetic material. A third electrical contact/heat sink 456 includes a first multi-layer section 458 having alternating layers of soft magnetic material and highly conductive material, and has a conductivity $\sigma_2$. Section 458 is electrically connected to a second portion 460 of the conductor. The second electrical contact/heat sink 456 also includes a second section 462 comprised of a soft magnetic material. Insulation 464 is positioned between the conductor and the return pole, and between the electrical contacts and the return pole. Additional insulation 466, 468 and 470 is positioned between the conductor and the write pole. All of the conductors act as heat sinks.

In the example of FIG. 16, the surrounding metal lead is a multi-layer structure including layers of soft magnetic material and layers of material with appropriate electrical and thermal properties (relatively high conductivity), such that its average electrical conductivity is appropriately lower than $\sigma_1$. The conductivities and materials would be engineered according to the given application. The first metal layer that forms conductor 440 will carry a higher current density because of its higher conductivity ($\sigma_1$), thereby producing a strong side field with polarity opposite that of the write-pole. This effect, in combination with the soft magnetic material results in reduced side fields, good cross-track field confinement, and shielding from adjacent tracks.

Figure 17:
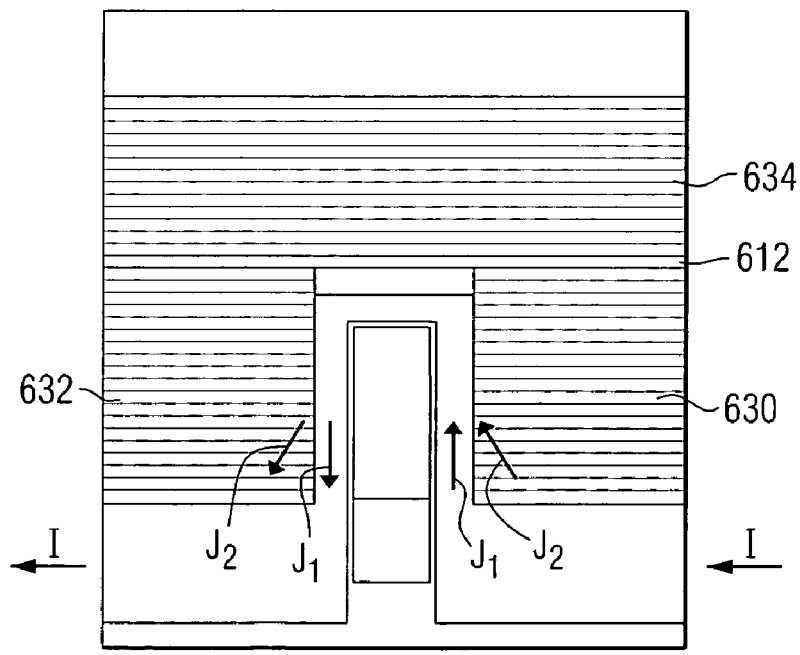

FIG. 17 is a schematic representation of another example of a field-confining WAMR design similar to that of FIG. 15, wherein the shields 630, 632 and 634 are a multi-layer structure including layers of soft magnetic material and layers of material with ideal electrical and thermal properties (high conductivity), such as Cu or Au, or the like. The multi-layer structure allows for its own magneto-static and magneto-dynamic properties to be readily tuned. For example, a large $M_s$ value for the magnetic layer results in a large ferromagnetic resonance (FMR) frequency, which is desirable for high frequencies (high data rates), while the thickness of the non-magnetic layer can be tuned to achieve the desired average $M_s$ for the shields, as well as to promote the desired magnetic domain structure. The multi-layer shields extend from the ABS a certain distance that is independent of the extent of the leads. The soft magnetic material of the multi-layer has the effect of confining the cross-track fields as discussed above, while the incorporation of the highly conducting layers aids in the heat sinking of the Ampere wire.

Figure 18:
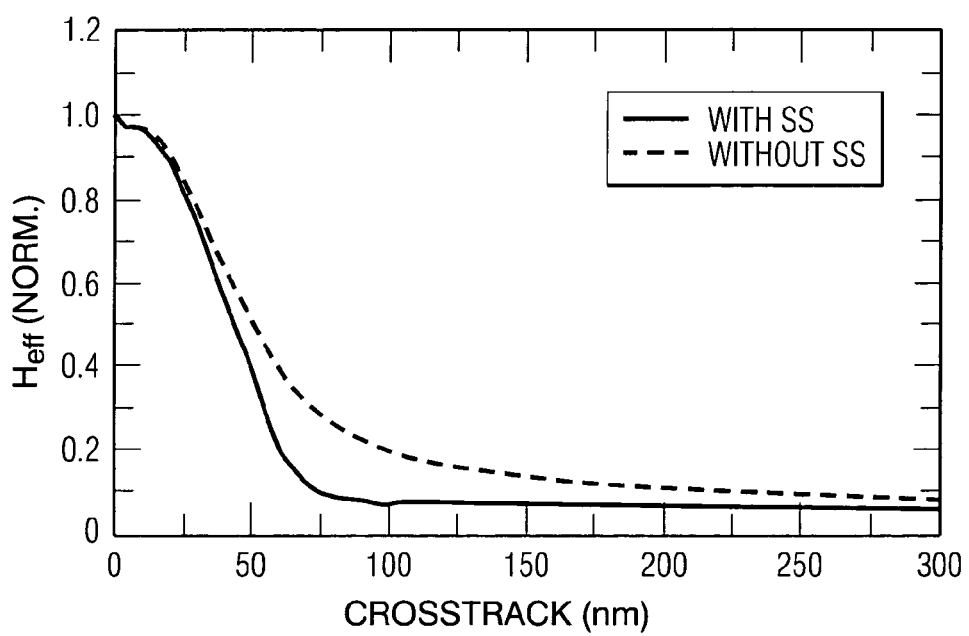
FIG. 18 is a graph of effective cross-track magnetic field.

FIG. 18 is data generated from a finite element model (FEM) of a three-dimensional model of a writer as depicted schematically by the head of FIG. 15. The two traces are the normalized magnetic-field profiles versus cross-track position for a WAMR writer with (solid trace) and without (dashed trace) magnetic side shields, measured at the trailing edge of the pole (pole/wire interface) and 10 nm from the ABS using a media with a magnetically soft underlayer. The data reveal that the side shielded WAMR (solid trace) has a better-confined cross-track profile than the WAMR without side shields (dashed trace).

FIG. 19 is a plan view of an air bearing surface of another magnetic recording head 480 constructed in accordance with this invention. The recording head includes a write pole 482 and a return pole 484. A tip 486 of the write pole is positioned adjacent to an air bearing surface (ABS) 488 of the recording head. A first conductor 490, having a conductivity $\sigma_1$, is positioned along the air bearing surface and extends along three surfaces 492, 494 and 496 of the write pole. The Ampere wire is formed by the section of conductor 490 that is adjacent to surface 494. A second conductor 498, having a conductivity $\sigma_2$, is positioned along the air bearing surface and extends along two surfaces 500 and 502 of the first conductor. A third conductor 504, having a conductivity $\sigma_2$, is positioned along the air bearing surface and extends along two surfaces 506 and 508 of the first conductor. A fourth conductor 510, having a conductivity $\sigma_3$, is electrically connected to the second conductor. A fifth conductor 512, having a conductivity $\sigma_3$, is electrically connected to the third conductor. Insulation 514 is positioned between the conductors 490, 498 and 504 and the return pole, and between the electrical contacts and the return pole. Additional insulation 516, 518 and 520 is positioned between the conductor 490 and the write pole.

FIG. 20 is a cross-sectional view of the magnetic recording head of FIG. 19 taken along line 20—20. FIG. 20 shows that the leads 510 and 512 each include a non-magnetic material 524 and 526 at the ABS that extend away from the ABS by a certain thickness, T, while beyond that thickness the lead includes a material 528 and 530 with ideal electrical and thermal properties, such as Cu or Au, or the like. Insulation 532 and 534 insulates the leads from the pole.

The example of FIGS. 19 and 20 includes an Ampere wire on top of the pole and continuous with a highly conductive metal layer on the sides of the pole that also extends away from the pole in the plane of the wafer. In addition, there is a thin insulating layer to electrically isolate the metal layer from the pole. The metal layer is surrounded by more than one material (represented by conductivities $\sigma_2$ and $\sigma_3$) where the conductivity of the adjacent material can vary from an insulator to a high conductivity material, with $\sigma_3 \leq \sigma_2 \leq \sigma_1$. The first metal layer, because of its higher conductivity $\sigma_1$, can carry a higher current density and is intended to produce a strong side field with a polarity opposite that of the write-pole, resulting in a reduced side field and improved cross-track field confinement. The thicknesses of the highly conductive metal layer (on the sides of the pole and in the plane of the wafer) and the layers, having conductivities of $\sigma_2$ and $\sigma_3$, can be engineered to produce the optimum cross-track field profile, field magnitude, and heat sinking.

Figure 21:
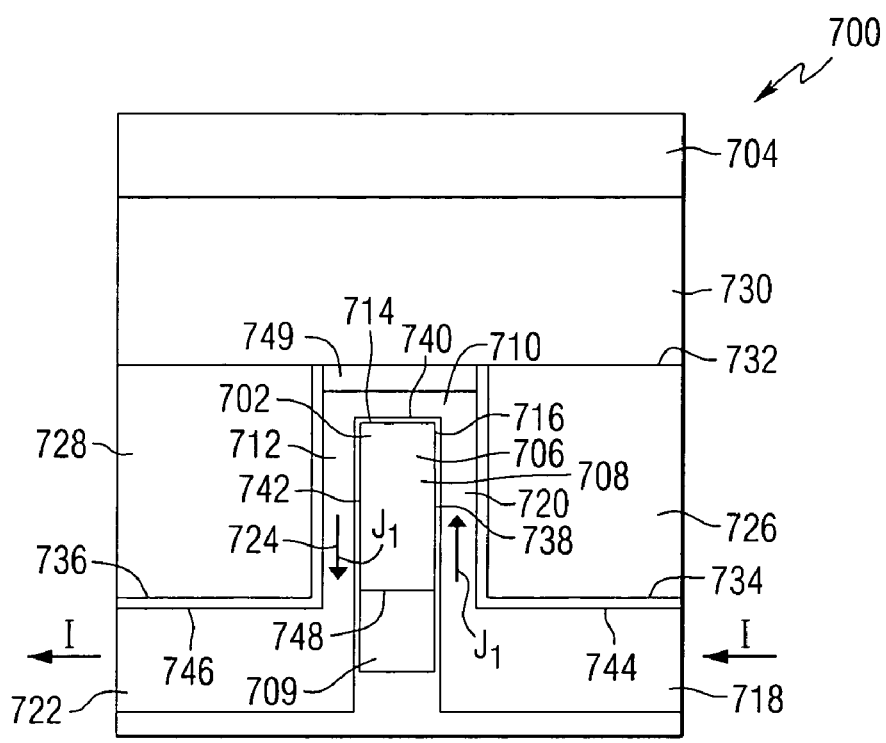
FIGS. 21 and 22 are plan views of an air bearing surface of other magnetic recording heads constructed in accordance with this invention.
Figure 22:
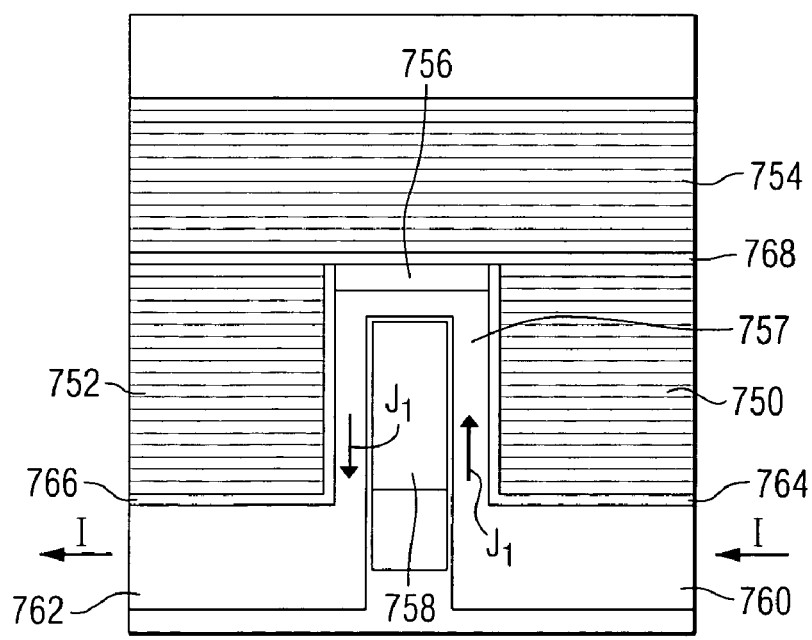

FIGS. 21 and 22 are plan views of an air bearing surface of other magnetic recording heads constructed in accordance with this invention. FIG. 21 is a schematic representation of an air bearing surface of another perpendicular WAMR magnetic recording head 700 constructed in accordance with this invention and having high conductivity current leads underlying a magnetic material of high permeability that acts as a side flux return path, or side shield. The recording head includes a write pole 702 and a return pole 704. A tip 706 of the write pole is positioned adjacent to an air-bearing surface (ABS) 708 of the recording head and on a nonmagnetic base 709. A conductor 710 is positioned along the air-bearing surface and extends along three surfaces 712, 714 and 716 of the write pole. In this example, the Ampere wire is the portion of the conductor along the top of the pole surface 714.

A first electrical contact/heat sink 718 is electrically connected to a first portion 720 of the conductor. A second electrical contact/heat sink 722 is electrically connected to a second portion 724 of the conductor. A first side shield 726 is positioned adjacent to a first portion of the conductor 710. A second side shield 728 is positioned adjacent to a second portion of the conductor 710. Another shield 730 is positioned between the write pole and the return pole. Insulation 732 is positioned between the shield 730 and the shields 726 and 728, and conductor 710. A layer of insulation 734 is positioned between conductor 718 and shield 726, and may additionally extend between the shield 726 and conductor 710. A layer of insulation 736 is positioned between conductor 722 and shield 728, and may additionally extend between the shield 728 and conductor 710. Additional insulation 738, 740 and 742 is positioned between the conductor and the write pole. Conductors 718 and 722 have a cross-sectional area that is large compared to the cross-sectional area of the conductor 710 that wraps around the write pole. Shields 726 and 728 extend along the sides of the write pole, and may be insulated from the adjacent conductors. The bottom edges 744 and 746 of the shields lie in substantially the same plane as the bottom edge 748 of the write pole. Insulating spacer 749 is positioned between the conductor 710 and the shield 730.

FIG. 22 is a plan view of another example of a field-confining WAMR design similar to that of FIG. 21, wherein the shields 750, 752 and 754 are a multi-layer structure including layers of soft magnetic material and layers of material with ideal electrical and thermal properties (high conductivity), such as Cu or Au, or the like. The Ampere wire 756 and conductor 757 wrap around three sides of the write pole 758 and is connected to conductors 760 and 762, each having a large cross-sectional area compared to the Ampere wire. The shields are insulated from conductors 760 and 762 by layers of insulation 764 and 766. These layers of insulation may also extend between the shields and the conductor 757. Another layer of insulation 768 is positioned between the shields. The multi-layer structure allows for its own magneto-static and magneto-dynamic properties to be readily tuned. For example, a large $M_s$ value for the magnetic layer results in a large ferromagnetic resonance (FMR) frequency, which is desirable for high frequencies (high data rates), while the thickness of the non-magnetic layer can be tuned to achieve the desired average $M_s$ for the shields, as well as to promote the desired magnetic domain structure. The multi-layer shields extend from the ABS a certain distance that is independent of the extent of the leads. The soft magnetic material of the multi-layer has the effect of confining the cross-track fields as discussed above, while the incorporation of the highly conducting layers aids in the heat sinking of the Ampere wire. In the described examples, different lead and shield thicknesses can be engineered to balance heat sinking and shielding.

Figure 23:
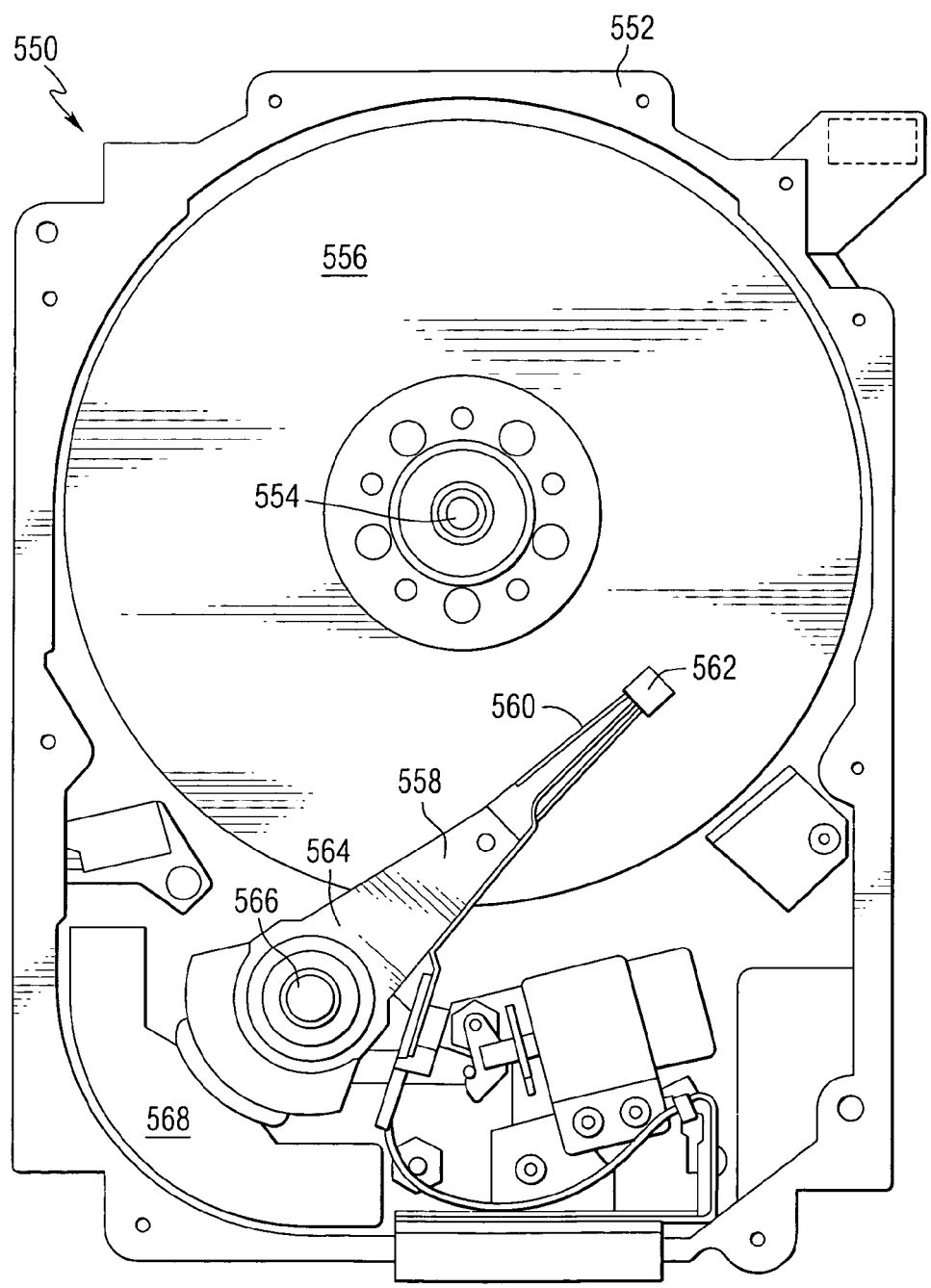
FIG. 23 is a pictorial representation of a disc drive that can include the recording heads of this invention.

FIG. 23 is a pictorial representation of a disc drive 550 that can use a recording head constructed in accordance with this invention. The disc drive 550 includes a housing 552 (with the upper portion removed and the lower portion visible in this view) sized and configured to contain the various components of the disc drive. The disc drive 550 includes a spindle motor 554 for rotating at least one magnetic storage medium 556, which may be constructed for either longitudinal or perpendicular magnetic recording, within the housing. At least one arm 558 is contained within the housing 552, with the arm 558 having a first end 560 with a recording head or slider 562, and a second end 564 pivotally mounted on a shaft by a bearing 566. An actuator motor 568 is located at the arm's second end 564 for pivoting the arm 558 to position the recording head 562 over a desired sector or track of the disc 556. The actuator motor 568 is regulated by a controller, which is not shown in this view and is well-known in the art.

This invention provides high-efficiency write heads using a thin-film wire integrated with an inductive write head at the ABS. The high flux density from the Ampere wire magnetizes the write pole and generates enough additional flux density with an appropriate spatial profile to augment the write field. In addition to an increased field magnitude, the field profile from the wire maps onto that of the write pole so as to yield improved field gradients. This design requires no current carrying "coils" to magnetize the inductive writer, minimizing the device inductance, and thus increasing the bandwidth from that of a traditional multi-coil inductive writer. The invention further provides head designs (applicable to both the coil-less design as well as coil-supported designs) where the magnetic field is further confined using magnetic shields and/or a field-canceling scheme using fields from currents induced in the leads. The heads generate field gradients and field magnitudes that exceed the capability of current technology, and the design can be readily fabricated and manufactured using common, low complexity materials and processing techniques.

This invention provides a magnetic recording head including a thin-film Ampere wire integrated with an inductive write head at the ABS. The high flux density from the Ampere wire magnetizes the write pole and generates enough additional flux density with an appropriate spatial profile to augment the write field. In addition to an increased field magnitude, the field profile from the wire maps onto that of the write pole so as to yield improved field gradients. The magnetic field is confined in the cross-track direction using magnetic shields and/or a side-field canceling scheme using fields from currents induced in the leads. In some examples, no current-carrying coils are required to magnetize the inductive writer, minimizing the device inductance, and thus, increasing the bandwidth from that of a traditional multi-coil inductive writer.

The recording heads of this invention generate field gradients and field magnitudes that exceed the capability of current technology, and the design can be readily fabricated and manufactured using common, low complexity materials and processing techniques. In addition to the disc drive described above, the recording heads of this invention can be used in other magnetic storage devices as well.

While the invention has been described in terms of several examples, it will be apparent that various changes can be made to the described examples without departing from the scope of the invention as set forth in the following claims. In addition, the recording heads are not limited to use in disc drives, but could be used in other storage devices wherein a magnetic field is used to affect the magnetization of a magnetic storage medium.

What is claimed is:

1. A magnetic recording head comprising:
    a write pole having a tip adjacent to an air bearing surface of the recording head;
    a return pole magnetically coupled to the write pole;
    a first conductor positioned adjacent to an edge of the write pole at the air bearing surface;
    a first conductive heat sink connected to the first conductor; and
    a second conductive heat sink connected to the first conductor, wherein at least a portion of each of the first and second conductive heat sinks is positioned adjacent to the air bearing surface and wherein each of the first and second conductive heat sinks includes a magnetic material positioned adjacent to the air bearing surface.

2. The magnetic recording head of claim 1, wherein the magnetic material is positioned adjacent to opposite sides of the write pole in a cross-track direction.

3. The magnetic recording head of claim 2, wherein the first conductor extends between the magnetic material and the sides of the write pole.

4. A magnetic recording head comprising:
    a write pole having a tip adjacent to an air bearing surface of the recording head;
    a return pole magnetically coupled to the write pole;
    a first conductor positioned adjacent to an edge of the write pole at the air bearing surface;
    a first conductive heat sink connected to the first conductor; and
    a second conductive heat sink connected to the first conductor, wherein at least a portion of each of the first and second conductive heat sinks is positioned adjacent to the air bearing surface and wherein each of the first and second conductive heat sinks includes conductive material having a conductivity lower than the conductivity of the first conductor.

5. The magnetic recording head of claim 4, wherein the first conductor is positioned between the conductive material and sides of the write pole.

6. A magnetic recording head comprising:
    a write pole having a tip adjacent to an air bearing surface of the recording head;
    a return pole magnetically coupled to the write pole;
    a first conductor positioned adjacent to an edge of the write pole at the air bearing surface;
    a first conductive heat sink connected to the first conductor; and
    a second conductive heat sink connected to the first conductor, wherein at least a portion of each of the first and second conductive heat sinks is positioned adjacent to the air bearing surface and wherein each of the first and second conductive heat sinks includes a nonmagnetic conductive portion electrically connected to a magnetic material portion at a position spaced from the air bearing surface.

7. A magnetic recording head comprising:
a write pole having a tip adjacent to an air bearing surface of the recording head;
a return pole magnetically coupled to the write pole;
a first conductor positioned adjacent to an edge of the write pole at the air bearing surface;
a first conductive heat sink connected to the first conductor; and
a second conductive heat sink connected to the first conductor, wherein at least a portion of each of the first and second conductive heat sinks is positioned adjacent to the air bearing surface and wherein each of the first and second conductive heat sinks includes a multi-layer portion including layers of magnetic material and layers of conductive material.

8. The magnetic recording head of claim 7, wherein the layers of magnetic material and the layers of conductive material lie in planes substantially perpendicular to sides of the write pole.

9. The magnetic recording head of claim 1, wherein the first conductor is positioned adjacent to opposite sides of the write pole and a down-track edge of the write pole.

10. The magnetic recording head of claim 9, wherein the first conductive heat sink is electrically connected to a first portion of the first conductor lying adjacent to a first side of the write pole and the second conductive heat sink is electrically connected to a second portion of the first conductor lying adjacent to a second side of the write pole.

11. A magnetic recording head comprising:
a write pole having a tip adjacent to an air bearing surface of the recording head;
a return pole magnetically coupled to the write pole;
a first conductor positioned adjacent to an edge of the write pole at the air bearing surface;
a first conductive heat sink connected to the first conductor; and
a second conductive heat sink connected to the first conductor, wherein at least a portion of each of the first and second conductive heat sinks is positioned adjacent to the air bearing surface and wherein each of the first and second conductive heat sinks includes a first section having a first electrical conductivity and a second section having a second electrical conductivity, wherein the first conductivity is greater than the second conductivity and wherein the first section is positioned adjacent to the first conductor.

12. The magnetic recording head of claim 11, wherein the electrical conductivity of the first conductor is greater than the electrical conductivity of the first section of the first and second conductive heat sinks.

13. A magnetic recording head comprising:
a write pole having a tip adjacent to an air bearing surface of the recording head;
a return pole magnetically coupled to the write pole;
a first conductor positioned adjacent to an edge of the write pole at the air bearing surface;
a first conductive heat sink connected to the first conductor; and
a second conductive heat sink connected to the first conductor, wherein the electrical conductivity of the first conductor is greater than the electrical conductivity of the first and second conductive heat sinks.

14. A magnetic recording head comprising:
a write pole having a tip adjacent to an air bearing surface of the recording head;
a return pole magnetically coupled to the write pole;
a first conductor positioned adjacent to an edge of the write pole at the air bearing surface;
a first conductive heat sink connected to the first conductor;
a second conductive heat sink connected to the first conductor; and
a shield positioned between the return pole and the first and second conductive heat sinks adjacent to the air bearing surface.

15. The magnetic recording head of claim 14, further comprising:
a spacer positioned between the shield and the first portion of the first conductor.

16. A magnetic storage device comprising:
a motor for rotating a storage medium; and
an arm for positioning a recording head adjacent to the storage medium;
wherein the magnetic recording head includes a write pole having a tip adjacent to an air bearing surface of the recording head, a return pole magnetically coupled to the write pole, a first conductor positioned adjacent to an edge of the write pole at the air bearing surface, a first conductive heat sink connected to the first conductor, and a second conductive heat sink connected to the first conductor, wherein at least a portion of each of the first and second conductive heat sinks is positioned adjacent to the air bearing surface and wherein each of the first and second conductive heat sinks includes a magnetic material positioned adjacent to the air bearing surface.

17. The magnetic storage device of claim 16, wherein the magnetic material is positioned adjacent to opposite sides of the write pole in a cross-track direction.

18. The magnetic storage device of claim 17, wherein the first conductor extends between the magnetic material and the sides of the write pole.

19. A magnetic storage device comprising:
a motor for rotating a storage medium; and
an arm for positioning a recording head adjacent to the storage medium;
wherein the magnetic recording head includes a write pole having a tip adjacent to an air bearing surface of the recording head, a return pole magnetically coupled to the write pole, a first conductor positioned adjacent to an edge of the write pole at the air bearing surface, a first conductive heat sink connected to the first conductor, and a second conductive heat sink connected to the first conductor, wherein at least a portion of each of the first and second conductive heat sinks is positioned adjacent to the air bearing surface and wherein each of the first and second conductive heat sinks includes a conductive material having a conductivity lower than the conductivity of the first conductor.

20. The magnetic storage device of claim 19, wherein the first conductor is positioned between the conductive material and sides of the write pole.

21. A magnetic storage device comprising:
a motor for rotating a storage medium; and
an arm for positioning a recording head adjacent to the storage medium;
wherein the magnetic recording head includes a write pole having a tip adjacent to an air bearing surface of the recording head, a return pole magnetically coupled to the write pole, a first conductor positioned adjacent to an edge of the write pole at the air bearing surface, a first conductive heat sink connected to the first conductor, and a second conductive heat sink connected to the first conductor, wherein at least a portion of each of the first and second conductive heat sinks is positioned adjacent to the air bearing surface and wherein each of the first and second conductive heat sinks includes a nonmagnetic conductive portion electrically connected to a magnetic material portion at a position spaced from the air bearing surface.

22. A magnetic storage device comprising:
a motor for rotating a storage medium; and
an arm for positioning a recording head adjacent to the storage medium;
wherein the magnetic recording head includes a write pole having a tip adjacent to an air bearing surface of the recording head, a return pole magnetically coupled to the write pole, a first conductor positioned adjacent to an edge of the write pole at the air bearing surface, a first conductive heat sink connected to the first conductor, and a second conductive heat sink connected to the first conductor, wherein at least a portion of each of the first and second conductive heat sinks is positioned adjacent to the air bearing surface and wherein each of the first and second conductive heat sinks includes a multi-layer portion including layers of magnetic material and layers of conductive material.

23. The magnetic storage device of claim 22, wherein the layers of magnetic material and the layers of conductive material lie in planes substantially perpendicular to sides of the write pole.

24. The magnetic storage device of claim 16, wherein the first conductor is positioned adjacent to opposite sides of the write pole and a down-track edge of the write pole.

25. The magnetic storage device of claim 24, wherein the first conductive heat sink is electrically connected to a first portion of the first conductor lying adjacent to a first side of the write pole and the second conductive heat sink is electrically connected to a second portion of the first conductor lying adjacent to a second side of the write pole.

26. A magnetic storage device comprising:
a motor for rotating a storage medium; and
an arm for positioning a recording head adjacent to the storage medium;
wherein the magnetic recording head includes a write pole having a tip adjacent to an air bearing surface of the recording head, a return pole magnetically coupled to the write pole, a first conductor positioned adjacent to an edge of the write pole at the air bearing surface, a first conductive heat sink connected to the first conductor, and a second conductive heat sink connected to the first conductor, wherein at least a portion of each of the first and second conductive heat sinks is positioned adjacent to the air bearing surface and wherein each of the first and second conductive heat sinks includes a first section having a first electrical conductivity and a second section having a second electrical conductivity, wherein the first conductivity is greater than the second conductivity and wherein the first section is positioned adjacent to the first conductor.

27. The magnetic storage device of claim 26, wherein the electrical conductivity of the first conductor is greater than the electrical conductivity of the first section of the first and second conductive heat sinks.

28. A magnetic storage device comprising:
a motor for rotating a storage medium; and
an arm for positioning a recording head adjacent to the storage medium;
wherein the magnetic recording head includes a write pole having a tip adjacent to an air bearing surface of the recording head, a return pole magnetically coupled to the write pole, a first conductor positioned adjacent to an edge of the write pole at the air bearing surface, a first conductive heat sink connected to the first conductor, and a second conductive heat sink connected to the first conductor, wherein the electrical conductivity of the first conductor is greater than the electrical conductivity of the first and second conductive heat sinks.

29. A magnetic storage device comprising:
a motor for rotating a storage medium; and
an arm for positioning a recording head adjacent to the storage medium;
wherein the magnetic recording head includes a write pole having a tip adjacent to an air bearing surface of the recording head, a return pole magnetically coupled to the write pole, a first conductor positioned adjacent to an edge of the write pole at the air bearing surface, a first conductive heat sink connected to the first conductor, and a second conductive heat sink connected to the first conductor; and
a shield positioned between the return pole and the first and second conductive heat sinks adjacent to the air bearing surface.

30. The magnetic storage device of claim 29, further comprising:
a spacer positioned between the shield and the first portion of the first conductor.

* * * * *

UNITED STATES PATENT AND TRADEMARK OFFICE
CERTIFICATE OF CORRECTION

| | | |
|---|---|---|
| PATENT NO. | : 7,212,367 B2 | Page 1 of 1 |
| APPLICATION NO. | : 10/869444 | |
| DATED | : May 1, 2007 | |
| INVENTOR(S) | : Thomas William Clinton et al. | |

It is certified that error appears in the above-identified patent and that said Letters Patent is hereby corrected as shown below:

Column 9, Line 17
"conductivity $\rho_2$." should read --conductivity $\sigma_2$.--

Signed and Sealed this

Twenty-seventh Day of November, 2007

JON W. DUDAS
*Director of the United States Patent and Trademark Office*